United States Patent
Houde, Jr. et al.

(10) Patent No.: US 7,821,389 B2
(45) Date of Patent: Oct. 26, 2010

(54) SYSTEM AND METHOD FOR PROVIDING EMERGENCY INFORMATION

(76) Inventors: William E. Houde, Jr., 173 Mill Plain Rd., Branford, CT (US) 06405; David H. Neaderland, 4 Watson Ct., Norwalk, CT (US) 06854; Douglas P. MacDonald, 111-7 Cosey Beach Ave., East Haven, CT (US) 06512; Nichols C. Everett, 99 Horsepond Rd., Madison, CT (US) 06443

( * ) Notice: Subject to any disclaimer, the term of this patent is extended or adjusted under 35 U.S.C. 154(b) by 343 days.

(21) Appl. No.: 12/055,703

(22) Filed: Mar. 26, 2008

(65) Prior Publication Data

US 2008/0238659 A1    Oct. 2, 2008

Related U.S. Application Data

(60) Provisional application No. 60/908,314, filed on Mar. 27, 2007.

(51) Int. Cl.
  *G08B 1/08* (2006.01)
  *G08B 5/22* (2006.01)
  *H04M 11/04* (2006.01)
(52) U.S. Cl. .................. 340/539.11; 340/539.13; 340/539.21; 340/539.23; 340/825.36; 340/825.49; 455/404.2
(58) Field of Classification Search ............. 340/539.11
See application file for complete search history.

(56) References Cited

U.S. PATENT DOCUMENTS

| | | | | |
|---|---|---|---|---|
| 4,998,095 | A * | 3/1991 | Shields | 340/574 |
| 5,111,187 | A * | 5/1992 | Heckleman et al. | 340/574 |
| 5,461,366 | A * | 10/1995 | Figuereo et al. | 340/574 |
| 5,661,471 | A * | 8/1997 | Kotlicki | 340/825.37 |
| 5,898,367 | A * | 4/1999 | Berube | 340/505 |
| 6,853,302 | B2 * | 2/2005 | Monroe | 340/573.1 |
| 6,894,612 | B2 * | 5/2005 | Xydis | 340/539.11 |
| 6,992,566 | B2 * | 1/2006 | Striemer | 340/10.1 |
| 7,099,676 | B2 * | 8/2006 | Law et al. | 455/456.6 |
| 7,116,988 | B2 * | 10/2006 | Dietrich et al. | 455/456.1 |

* cited by examiner

*Primary Examiner*—Donnie L Crosland
(74) *Attorney, Agent, or Firm*—St. Onge Steward Johnston & Reens LLC (57) ABSTRACT

A monitoring system that allows for a handheld device to transmit information to a monitoring station indicative of an emergency situation within a facility. The handheld device is provided as a keyfob and transmits a wireless RF signal to transceivers variously positioned throughout the facility. Based on identifying which transceiver is in alert, personnel can determine the location of the emergency situation and track the movement of the keyfob as it is moved throughout the facility. Additionally, two-way communication can be established with via the system to provide a maximum amount of information to security personnel and first responders as well as allowing for specific instructions to be given to select personnel in the emergency area.

35 Claims, 6 Drawing Sheets

SYSTEM AND METHOD FOR PROVIDING EMERGENCY INFORMATION

CROSS-REFERENCE TO RELATED APPLICATIONS

This application claims the benefit of the filing date of U.S. Provisional Patent Application Ser. No. 60/908,314 filed Mar. 27, 2007.

FIELD OF THE INVENTION

The invention relates to a security alert, notification and location system, and more particularly to a system and method for rapidly providing selected personnel, information relating to an event.

BACKGROUND OF THE INVENTION

It is critical, especially in certain facilities (e.g. schools, transportation hubs, parking garages, large facilities) for rapid transmission of information in the event of an emergency. In view of the increasing number of incidents at schools, children, teachers, patrons and employees have increasingly become vulnerable to violent events.

In responding to an emergency situation, time is of the essence to reach individuals in the threat area. For example, individuals may require urgent medical attention or individuals need to be moved out of the threat area for their safety.

One of the greatest challenges to emergency personnel is gathering information on the nature of the emergency/threat and determining the location of the threat and individuals in the area. For example, in a school, there may be an individual(s) that pose a threat to the students and/or teachers. The more information provided to emergency personnel quickly, the faster the emergency personnel can locate and care for the students and/or teachers.

In view of the increasingly threats of violence directed toward personnel, it would be highly advantageous to virtually instantaneously determine a location of personnel in an emergency situation and/or in the vicinity of a threat.

A number of various systems have attempted to provide emergency alerting systems with various levels of success. One system is disclosed in U.S. Pat. No. 4,998,095 (Shields) entitled "Emergency Transmitter System." Shields discloses an emergency transmitter system for enhancing personal safety within a predetermined geographical area. A plurality of fixed transceivers is located at selected locations and a battery-powered RF transmitter is issued to an individual. In the event of an emergency, the transmitter is actuated sending a coded signal identifying the individual. The fixed transceiver receives the coded signal and retransmits the signal to a central location identifying the individual and the location of the fixed transmitter. However, Shields is a system designed to function outside over a large area and can not accurately pinpoint the location of an individual(s) in a building.

Other systems are disclosed in U.S. Pat. No. 5,111,187 (Heckleman et al.) entitled Personal Security System Network with False Alarm Prevention and U.S. Pat. No. 5,461,366 (Figuereo et al.) entitled Remote Alarm System. Heckleman et al. and Figuereo et al. provide similar solutions as discussed in connection with Shields, but further discloses that the transmitter may only transmit a signal once to inhibit false alarms. This system again, can not function in an enclosed environment, such as a building with multiple floors, nor can it track individuals as they move throughout a building or predetermined area.

Another system is disclosed in U.S. Pat. No. 5,661,471 (Kotlicki) entitled Emergency Alert System for a Protected Region Employing RF and Non-RF Signaling. Kotlicki discloses use of a transmitter that sends both an RF and non-RF signal to a receiver to assist in locating an individual in an enclosed environment such as, ultrasonic and infrared signals. The use of non-RF signals will allow the system to differentiate between multiple receivers picking up the RF signal that can penetrate walls and make precise location difficult. However, a problem with infrared and ultrasonic signals is they are limited by line-of-sight (LOS) and if there is no clear LOS, the system will not be able to precisely locate the origin of the signal as multiple receivers may pick up the RF signal.

Another system is disclosed in U.S. Pat. No. 6,853,302 (Monroe) entitled Networked Personal Security System. Monroe describes a system where a personal alarm system can be worn by a user and may send a signal to a remote monitoring station. The unit includes a ID memory for identifying the user. For application where it is important to identify the location of the user, Monroe describes the process where various receivers positioned around the facility are provided as beacon transmitters that each transmit a unique beacon ID which is stored on the personal alarm. In the even of actuation of the alarm, the unique code corresponding to the saved ID is transmitted to the system to the system. Based on the unique code transmitted by the personal alarm, the system can determine where the user was when the signal was stored. In larger areas, such as schools, Monroe discloses that GPS technology can be used to locate the user. A major problem with this system is that in the beacon transmitter embodiment, the location of the user is identified by the beacon transmitter code transmitted, which may or may not be the current or real-time location of the user as they move throughout the facility. In the GPS embodiment, this simply would not function properly in a closed environment such as a building with multiple floors both above and below ground.

Still another system is disclosed in U.S. Pat. No. 6,894,612 (Xydis) entitled Monitoring Method and System. Xydis discloses a system where a plurality of transponders are carried by individuals that can communicate with a plurality of transceivers positioned throughout an area. The transponders are provided with a code that identifies the transponder. In the event of an emergency, the transponder sends a signal containing the transponder code to the transceiver, which in turn sends a transceiver signal including a unique transceiver code to a monitoring system. However, the system disclosed in Xydis can not accurately pinpoint the location of an individual because all transceivers that receive the transponder code will transmit the signal to the monitoring system identifying the individual's position in multiple locations. This can severely hamper the efforts of emergency personnel to reach individuals quickly as it may not be clear if the individual(s) is/are on one floor or another.

SUMMARY OF THE INVENTION

Accordingly, it is one objective of the invention is to provide rapid, accurate, detailed information specific to critical events.

Another objective of the present invention is to provide a visual interface that provides personnel/authorities with an actual location of the personnel that may be in danger.

It is still another objective of the invention to provide accurate information during an event such that if an original location of the personnel that may be in danger changes, the system will provide the updated location and/or any additional information that may become available.

These and other objectives are achieved by provision of a system and method that, in one advantageous embodiment, includes a plurality of RF transceivers positioned throughout a facility. The RF transceivers are coupled to a network, which is tied to one or more central monitoring stations.

In one advantageous embodiment, the transceivers transmit the data that includes an electronic serial number that is correlated to information in a database.

Selected personnel are each provided with a wireless personal notifier. For example, in a school setting, each teacher may be provided with a personal notifier that, when activated, transmits selected data received by an RF transceiver. The personal notifier may be provided as either a one-way transmitter or a two-way transceiver. Initially, when activated, the personal notifier may send an initial packet of information relating to the person to whom it is assigned (e.g. name, mobile telephone number or other information).

The personal notifier sends the information as an RF signal to be picked-up by the nearest RF transceiver. It is contemplated that the RF transceivers will only transmit a received RF signal that exceeds a threshold level. Further, the personal notifier is provided such that the RF signal cannot exceed the threshold level of the RF transceiver unless located within a desired radius of the RF transceiver. Based on the positioning of the transceivers, only one receiver will at any time transmit the RF signal.

In another embodiment, it is contemplated that signal triangulation may be employed to determine the precise location of an individual in a building. This technique may be advantageous in multi-floor facilities where transceivers on multiple floors (e.g. on the current floor and an adjacent floor, either above or below) pick up the RF signal. In this case, signal triangulation can be utilized to determine the precise location of an individual even in multistory structures.

Also provided at a central monitoring station is a visual interface of the facility. The RF transceivers are positioned throughout the facility. In one embodiment, as only one RF transceiver at any one time will transmit the RF signal, monitoring personnel will be able to visually determine where the event is occurring in the facility by locating the RF transceiver that is in alert. In another embodiment, signal triangulation of the multiple transceivers in alert will allow the system to identify the precise location of the individual.

It is contemplated that the RF signal is substantially instantaneously transmitted to key personnel at the facility and that with a short time delay, the emergency signal is also sent to a central monitoring station.

It is still further contemplated that the personal notifier can provide manually inputted information and may include, for example, a keypad such that the user may input text data providing emergency personnel with additional information relating to the event. Alternatively, the personal notifier may be provided with an audio input such that the user may quickly describe the nature of the event and/or emergency. Still further, it is contemplated that the RF transceivers maybe provided with audio/visual capabilities such that, upon activation, the RF transceivers begin transmitting audio and/or visual information from the area. Once an alert has been received, it is contemplated that personnel monitoring the situation may want to monitor additional areas in the vicinity of the event. To that end, the system may be provided such that any one of the RF transceivers may be "turned-on" by the monitoring personnel to transmit audio and/or visual information to the central monitoring station or to any other monitoring location.

In this manner, maximum information is transmitted to emergency personnel relating to the event so that proper planning and response can be implemented to protect personnel in the facility and the emergency personnel.

In still another embodiment, it is contemplated that as a user moves throughout the facility, the RF transceivers will be able to track the movements of the personal notifier throughout the facility thereby providing monitoring personnel with additional information relating to the location of personnel in the facility. This can be critically important information to the police and first responders, as they will be receiving instantaneous real-time information relating to the location of, for example, a teacher moving students throughout a school facility. If the police and first responders have this real-time information, they can immediately move into the area where the teachers, students, patrons and/or employees are positioned to secure the area.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment a monitoring system for monitoring an alert indicative of an emergency situation is provided comprising at least one wireless transmitter transmitting a wireless signal indicating an emergency situation exists, the wireless signal further including information related to an individual to whom the wireless transmitter is assigned. The system further comprises a plurality of transceivers located throughout a facility including a first transceiver that receives the wireless signal and transmits an alert signal to a security alert station indicating the identity of the transceiver that received the wireless signal and identifying the individual to whom the wireless transceiver is assigned. The system is provided such that when the at least one wireless transmitter is moved away from the vicinity of the first transceiver and toward the vicinity of a second transceiver, the second transceiver transmits an alert signal to the security alert station indicating the identity of the second transceiver and identifying the individual to whom the wireless transmitter is assigned. The system is further provided such that when both the first and second transceivers transmit alert signals, the system performs a signal strength comparison to determine which transceiver received a stronger wireless signal such that the monitoring system tracks the movement of the at least one wireless transmitter as it moves throughout the facility.

In another advantageous embodiment a method of monitoring an alert indicative of an emergency situation is provided comprising the steps of positioning a plurality of transceivers throughout a facility, coupling the plurality of transceivers to a security alert station and providing at least one wireless transmitter. The method further comprises the steps of storing information related to an individual on the at least one wireless transmitter and transmitting a wireless signal from the at least one wireless transmitter to at least one of the plurality of transceivers indicating an emergency situation exists, the wireless signal including information related to the individual to whom the wireless transmitter is assigned. The method still further comprises the steps of receiving the wireless signal at a first transceiver and transmitting an alert signal from the first transceiver to a security alert station indicating the identity of the first transceiver and identifying the individual to whom the wireless transmitter is assigned. The method also comprises the steps of moving the wireless transmitter away from the vicinity of the first transceiver and toward the vicinity of a second transceiver, receiving the wireless signal at the second transceiver and transmitting an alert signal from the second transceiver to the security alert station indicating the identity of the second transceiver and identifying the individual to whom the wireless transmitter is assigned. Finally, the method comprises the steps of performing a signal strength comparison of the wireless signals received at the first and second transceivers and determining a location of the wireless transmitter based at least in part on the signal strength comparison such that the movement of the at least one wireless transmitter is tracked as it is moved throughout the facility.

Other objects of the invention and its particular features and advantages will become more apparent from consideration of the following drawings and accompanying detailed description.

DETAILED DESCRIPTION OF THE INVENTION

Referring now to FIGS. 1-3B, wherein like reference numerals designate corresponding structure throughout the views.

Figure 1:
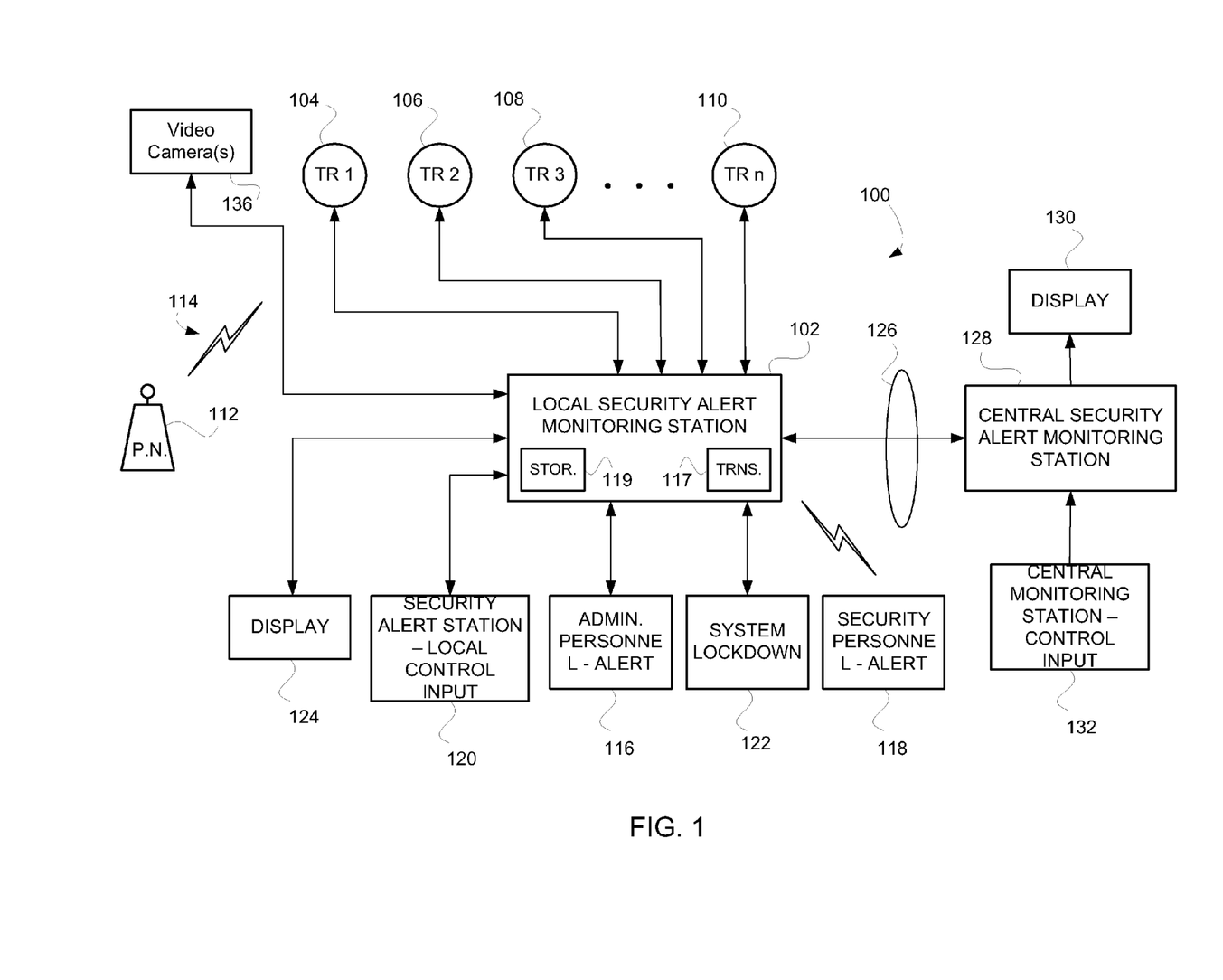
FIG. 1 is a block diagram of one advantageous embodiment of the present invention depicting a monitoring system for monitoring an alert indicative of an emergency situation.

FIG. 1 is a block diagram illustrating monitoring system 100. Monitoring system 100 typically includes a security alert station 102 that may be located at a facility (not shown). Monitoring system 100 also includes a plurality of transceivers (104, 106, 108, 110) positioned throughout the facility for receiving a wireless signal 114 from a personal notifier 112. It is contemplated that virtually any number of transceivers may be placed in the facility as is illustrated by the designation $TR_1$ through $TR_n$.

Security alert station 102 may comprise a processor or series of processors, a personal computer, programmable controller or a host of logic devices capable of receiving and processing a signal from a transceiver in alert status.

Once the security alert station 102 receives at least one alert signal, a number of automatic responses may occur. For example, the system 100 may be set to send an administrative personnel alert 116 via a transmitter 117 to various administrative personnel throughout the facility. The alert may comprise one or more alert forms, such as for example but not limited to, an email or text message to a personal computer or portable device or an audible announcement in the facility.

It is further contemplated that a security personnel alert 118 may automatically be wirelessly transmitted to security personnel located on or off site allowing for immediate response to an emergency situation. The security personnel alert 118 may provide immediate information to security personnel including the location of the emergency and the identity of the individual assigned the personal notifier 112 that has been activated. As more information becomes available, for example, the nature of the emergency, the need for medical personnel, the need for armed security personnel, the need to secure various locations of the facility where individuals may be grouped together, etc., this information may also be transmitted to the security personnel.

The security alert station 102 may also be provided with a security alert station local control input 120. This may comprise any type of interface device allowing a user to enter commands and/or access information from the security alert station 102. For example, a security alert may be transmitted to a security administrator. The security administrator then accesses the system 100 to determine the location and identity of the personal notifier 112 that send the alert. It is contemplated that a number of actions could then be taken by the security administrator including activating a system lockdown 122, which could serve to lock some or all of the doors in the facility preventing movement of personnel. It is further contemplated that a system lockdown could be accomplished automatically and may only be rescinded by select personnel. Further, a system lockdown could be initiated via a remote device, such as a wireless device worn by select security personnel that may include some or all of the facility.

Also provided at security alert station 102 is a display 124 that may provide a graphic representation of the layout of the facility. The graphic display may comprise a plan view or any other view of the facility illustrating the location of each room, door, window and/or fixed transceiver in the facility. In this manner, the security administrator could quickly and easily identify the building, floor, room and in some instances, the location in the room where the alert was generated. It is still further contemplated that additional information could be accessed on display 124. For example, in a school application, the name of the instructor and the names of the students for that time could be listed on the screen along with contact information such as mobile telephone numbers and SMS addresses could be listed.

Figure 2:
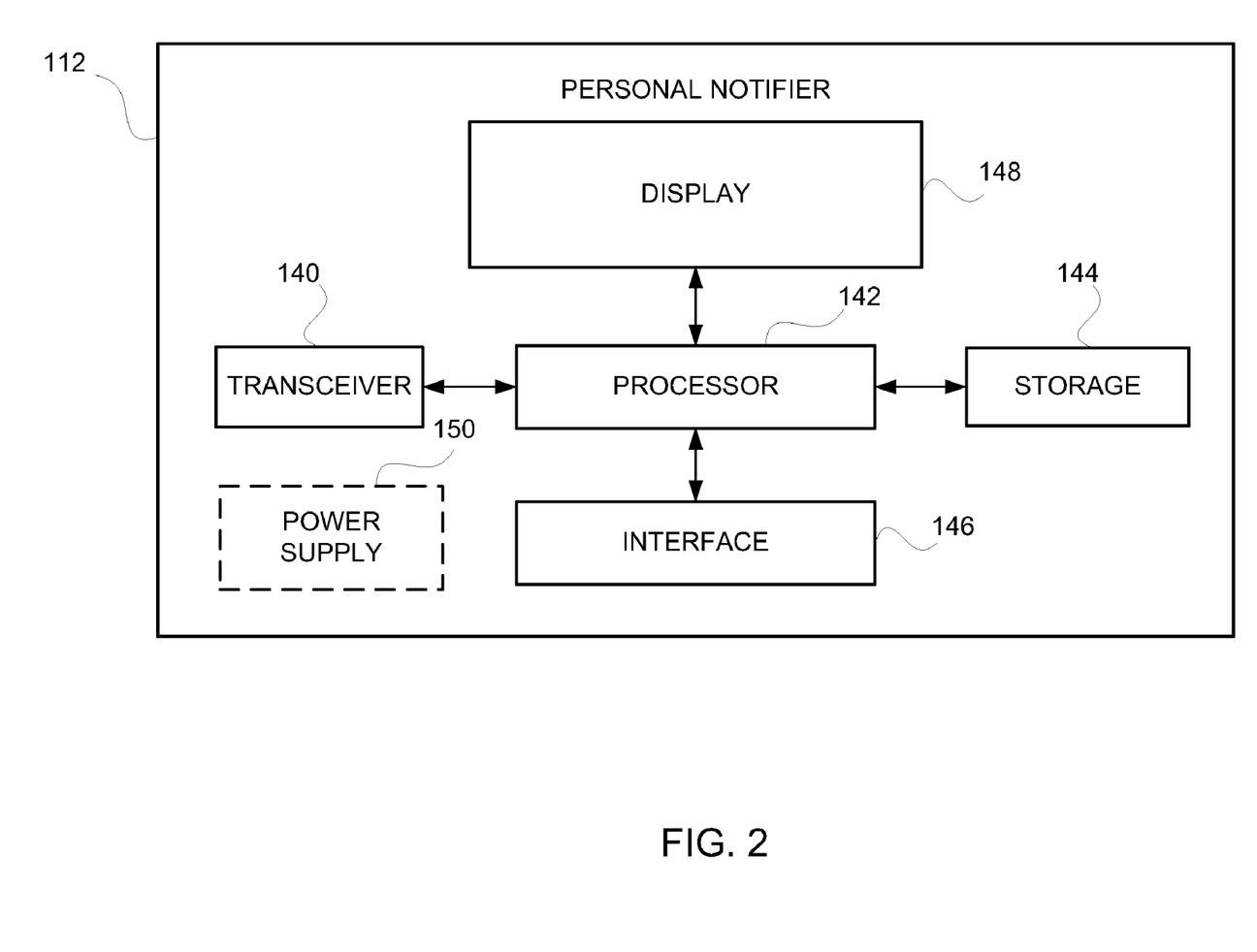
FIG. 2 is a block diagram according to FIG. 1 illustrating the personal notifier in greater detail.

Turning to FIG. 2, personal notifier 112 is illustrated in more detail and generally comprises a transceiver 140, a processor 142, a storage 144, an interface 146 and a display 148. The personal notifier may, in one embodiment, comprise a power supply 150 such as, for instance, a rechargeable battery. Additionally, the personal notifier 112 may be provided as a keyfob, which comprises a relative small handheld device that may be discretely worn by the individual to whom it is assigned or may be attached to, for example, a key chain. This would allow, for example, a teacher to silently transmit an alert that an emergency situation has or is developing allowing emergency personnel to react quickly to the situation.

Transceiver 140 may be provided as any type of wireless transceiver, but is preferably a Radio Frequency (RF) transceiver, capable of sending and receiving RF signals. Information relating to the individual to whom the personal notifier 112 is assigned may be stored on storage 144 including, for example, the name of the individual, their age, their mobile telephone number, a description of the individual, any known medical conditions, or any other additional information about the individual that may assist emergency personnel. The personal notifier 112 may further be configured to receive information from the system 100, such as opening an audio channel with, for example, the security administrator, or sending text or email correspondence. The inquiries could be automatically generated asking the individual to identify the nature of the emergency and whether medical or security personnel are required. As illustrated in FIG. 2, the personal notifier 112 is provided with interface 146 that may take the form of a keyboard, and/or may comprise a speaker/microphone. In any event, it is contemplated that additional information may be received and transmitted to emergency personnel responding to the alert status.

The display 148 provided on personal notifier 112 may comprise any type of screen, such as but not limited to an LCD or LED for displaying messages. In this manner, in the event of an emergency, not only will audio messages by transmitted throughout the facility, but specific messages and/or instructions may be transmitted to each personal notifier. The messages may then be stored in storage 144 for later access if necessary.

Referring back to FIG. 1, a network connection 126 is provided coupling security alert station 102 with central monitoring station 128. Network connection can comprise virtually any type of network connection including both networks and internetworks of all kinds, including the Internet, and is not limited to any particular network or inter-network.

Central monitoring station 128 may be located at a remote location from the facility and may be monitored by a monitoring company and/or police or other emergency personnel. Central monitoring station 128 may further be provided with display 130 that may provide similar information as provided by display 124 such that first responders are provided with a maximum amount of information relating to the emergency situation. Also provide is a central monitoring station control input 132. It is contemplated that central monitoring station control input 132 may provide similar functions and capabilities as security alert station local control input 120 thereby allowing the facility to be notified, specific instructions sent, additional information to be received, the facility to be locked down and so forth from the central monitoring station 128. It is still further contemplated that specific instructions may be sent from central monitoring station 128 to the security administrator at the facility, which may include text, email or instant messaging to security alert station 102 and/or opening an audio channel with the security administrator. All of these features allow for rapid transmission of accurate information from an emergency location to administrative and security personnel as well as first responders.

Figure 3A:
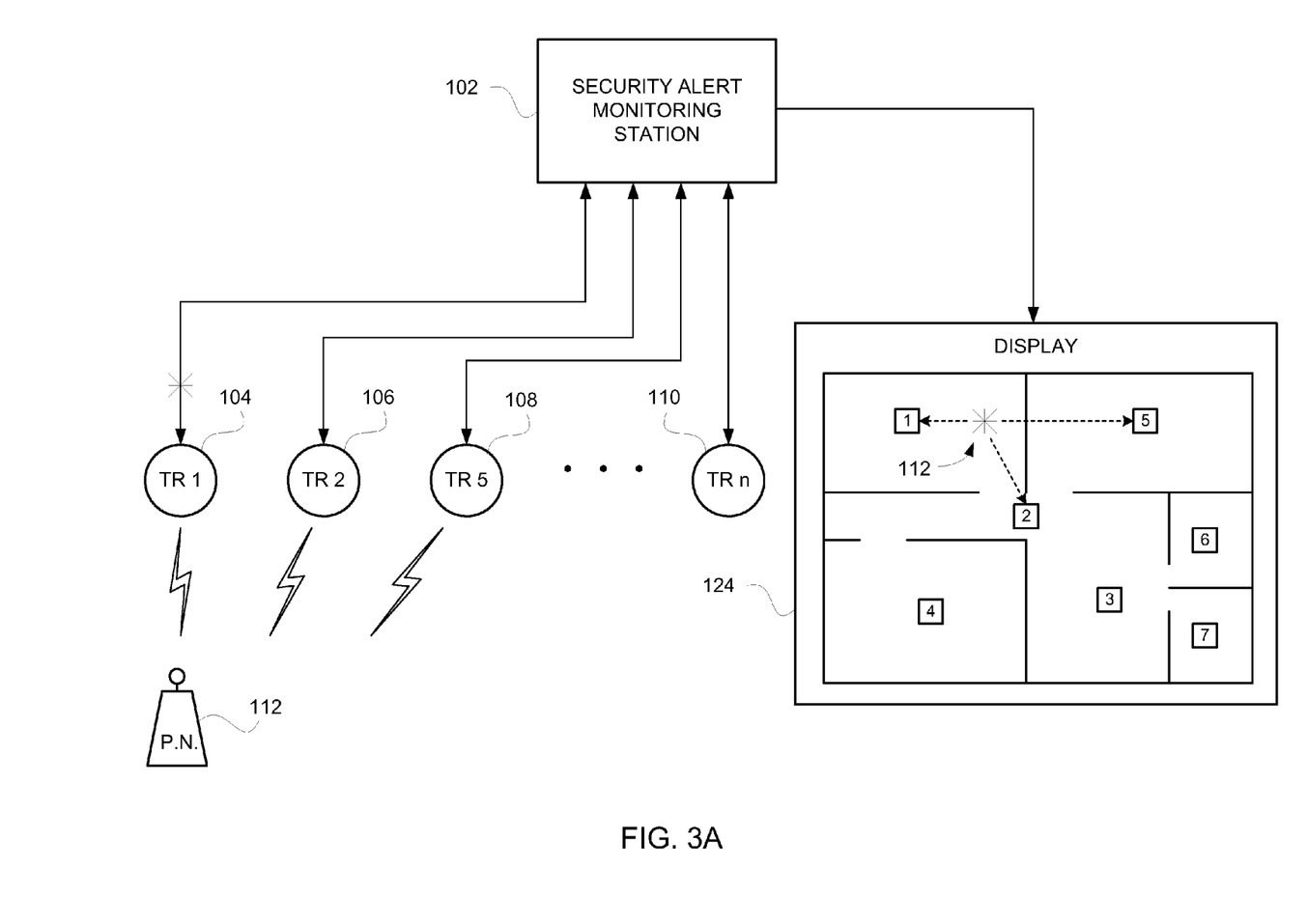
FIG. 3A is a block diagram of the advantageous embodiment according to FIG. 1 showing the interaction of a personal notifier with the monitoring system.
Figure 3B:
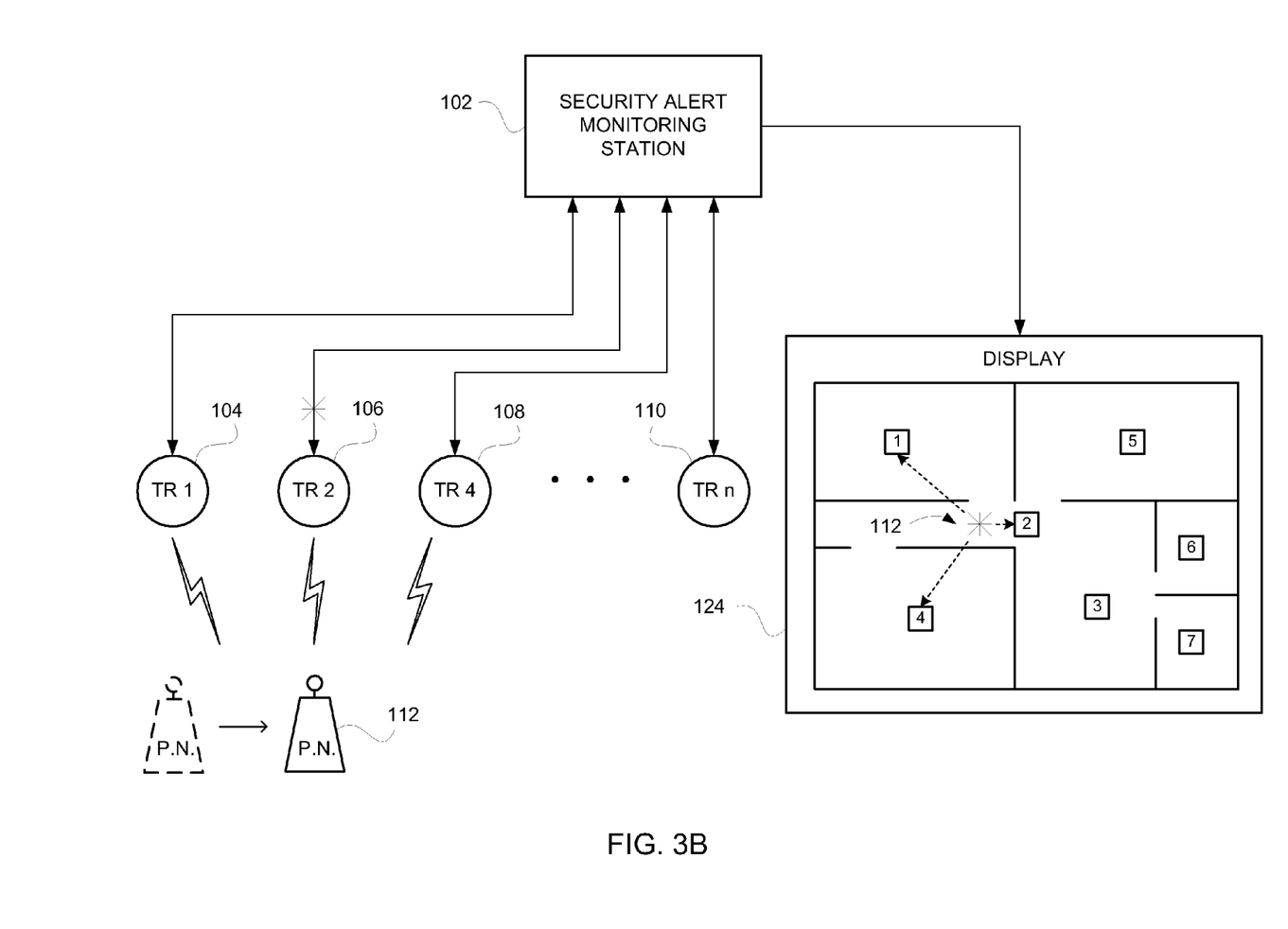
FIG. 3B is a block diagram of the advantageous embodiment according to FIG. 3A showing the interaction of the personal notifier with the monitoring system as the personal notifier is moved within the facility.
Figure 3C:
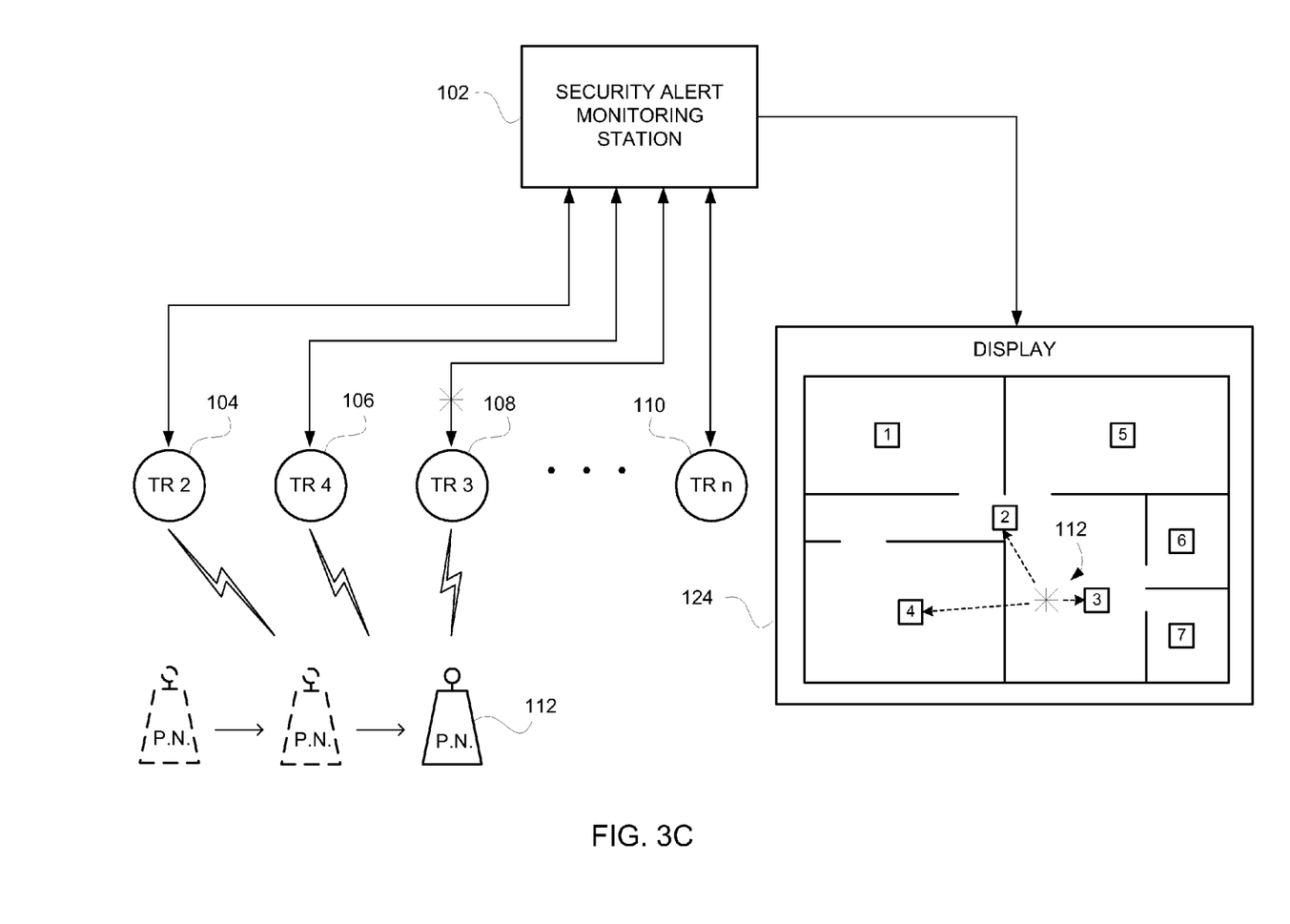
FIG. 3C is a block diagram of the advantageous embodiment according to FIG. 3A showing the interaction of the personal notifier with the monitoring system as the personal notifier is moved throughout the facility.

Turning now to FIGS. 3A-3C, a personal notifier 112 is illustrated in alert status. A wireless signal is transmitted from the personal notifier 112 to the nearest transceiver 104. Transceiver 104 is provided with a threshold signal level that must be exceeded prior to transceiver sending an alert signal to security alert monitoring station 102.

In one advantageous embodiment, personal notifier 112 may be provided with limited signal strength such that the threshold level will only be exceeded if the personal notifier 112 is positioned relatively close in proximity to transceiver 104 and due to its close proximity to transceiver 104, can not exceed threshold levels for transceivers 106, 108. In this embodiment, only one transceiver 104, 106, 108 will transmit an alert signal allowing monitoring personnel to locate the event. This data is then received and stored in storage 119. While FIGS. 3A-3C illustrate the information being sent to local security alert monitoring station 102, it is contemplated that all information discussed connection with FIGS. 3A-3C are equally applicable to central security alert monitoring station 126 and displays 124 and 130. Each transceiver may have assignable thresholds. Additionally, these thresholds can be set to accept or reject signals within relatively defined areas.

In still another embodiment, multiple transceivers may pick up the wireless signal that exceeds the threshold level for that particular transceiver. In this case, each transceiver that receives the wireless signal will transmit and alert signal to the security alert monitoring station 102 including the identification of the personal notifier in alert 112, the transceiver in alert and the signal strength of the received wireless signal. Once security alert monitoring station 102 receives multiple signals, a signal comparison can be automatically carried out to resolve the location of the personal notifier 112 (e.g. which transceiver received the strongest wireless signal corresponding to which transceiver is the personal notifier is closest to). Alternatively the relative signal strengths could provide additional information allowing for even greater accuracy in locating the exact position of the personal notifier relative to each of the transceivers in alert.

Unlike the prior art systems that utilize a variant of time alignment for positioning, the system 100 uses signal strength or signal integrity to determine positioning. The transceivers 104, 106, 108, 110 provide spherical transceiver coverage allowing for coverage across a floor but also from floor to floor. It is contemplated that the most likely position for a personal notifier 112 is within an area of intersection of the most spheres. The system 100 can weight accuracy by non-uniform placement of the transceivers 104, 106, 108, 110. A major difference between the present invention and prior art systems is that the present invention does not provide raw location data such as Global Positioning System (GPS) coordinates, but rather data that relates exclusively to the map overlay of transceivers 104, 106, 108, 110 on the facility layout. In the present system 100, there is no requirement that a signal be acquired by more than one transceiver, rather, only when more than one transceiver actually does pick up the wireless signal is signal comparison used to determine likely position.

FIGS. 3A-3C illustrate multiple transceivers positioned throughout a facility for picking up a wireless signal. In FIG. 3A a position for personal notifier 112 is identified in a room with transceiver (1). It is possible that only transceiver (1) picked up the wireless signal, or that transceivers (1, 2 & 5) all picked up the signal and through signal comparison the system 100 resolved that personal notifier 112 was positioned closest to transceiver (1). FIG. 3B illustrates how system 100 tracks movement of personal notifier 112 throughout the facility. In this illustration, now transceivers (1, 2 & 4) are the closest to personal notifier 112. Again, the transceivers could be positioned such that only transceiver (2) picks up the signal, or that through signal comparison, it is determined that personal notifier 112 is nearest to transceiver (2). Finally, FIG. 3C illustrates the movement of personal notifier to a location nearer to transceiver (3). In this manner, system 100 tracks the movement of a personal notifier (and presumably the movement of an individual(s) throughout a facility. It is contemplated that personal notifier 112 can continuously send a wireless signal or on a periodic basis, indicating the current location of personal notifier 112. This will allow first responders to have accurate, real-time information on the location of individuals in a facility.

It is further contemplated that the display will store the information received from personal notifier 112 so that the route taken by the individual(s) can be forensically tracked as they moved throughout the facility. Further, a visual indication (e.g. a change in the color or some kind of indicator) that a particular transceiver is currently receiving or recently received a wireless signal from a personal notifier 112 can be illustrated on the display 126. This would allow for quick identification by personnel to visually see the route the personal notifier 112 has taken.

Figure 4:
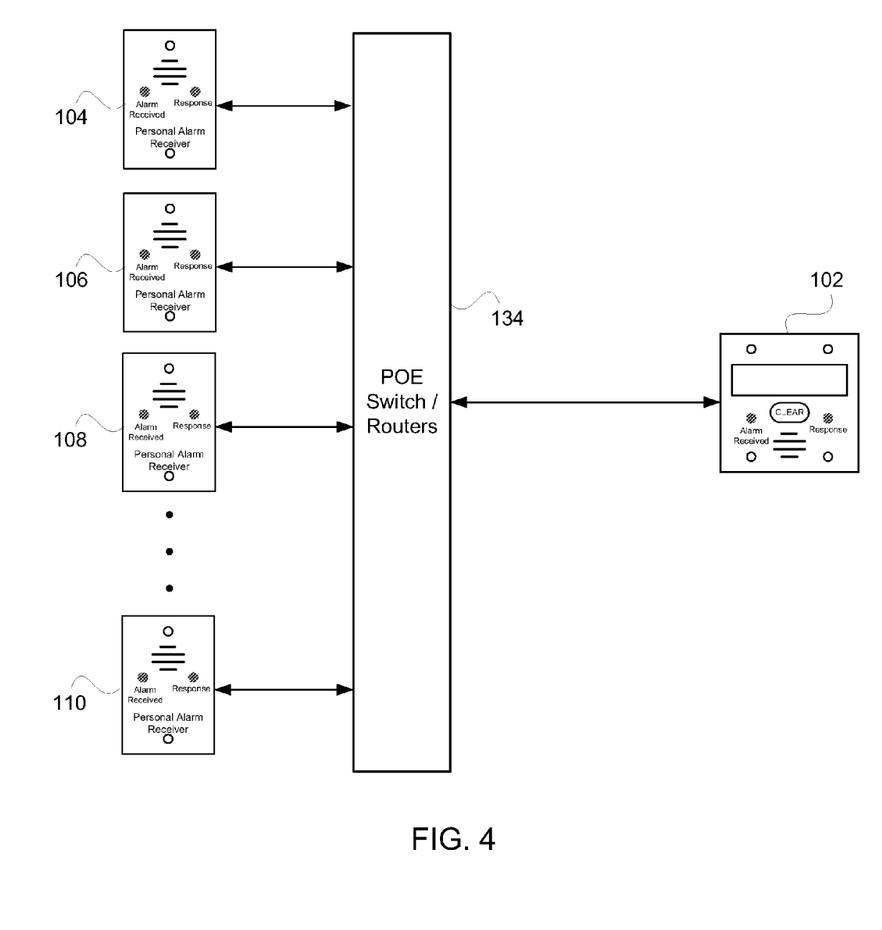
FIG. 4 is a block diagram of the advantageous embodiment according to FIG. 1 illustrating POE Switch/Router/Hub configurations.

Referring now to FIG. 4, a wall-mounted embodiment for transceivers 104, 106, 108, 110 is illustrated. A plurality of wall-mounted transceivers is illustrated coupled to POE Switch/Router(s) 134 and coupled to security alert monitoring station 102. It is contemplated that POE Switch/Router(s) 134 can comprise virtually any type of switch and/or router for transmitting an alert signal from a transceiver(s) to security alert monitoring station 102.

The wall-mounted transceivers may be mounted in each room as well as common areas or even in multiple locations in large rooms, such as for example, auditoriums. In addition, each wall-mounted transceiver may be provided with audio capability such that public announcement notifications may be transmitted and broadcast from the wall-mounted transceiver. The wall-mounted transceivers are also provided such that two-way audio communication is facilitated allowing security personnel to better evaluate an emergency situation and pass along information to first responders.

In one embodiment, it is contemplated that transceivers 104, 106, 108, 110 are coupled to security alert monitoring station 102 via a network connection. This network connection may comprise virtually any type of connection type including wired and wireless. In one embodiment, a dedicated network cable is used to couple the transceivers 104, 106, 108, 110 to security alert monitoring station 102. In another embodiment, communication may occur over power lines. For example, transceivers 104, 106, 108, 110 may be powered by an AC power line and communications may be modulated over the AC power line.

Still further contemplated is that video camera(s) 136 (FIG. 1) positioned throughout the facility may be automatically actuated to provide a video feed from an area in the vicinity of a transceiver in alert. It is also provided that via a control input from either local security alert monitoring station 102 or from central security alert monitoring station 128, additional video cameras 136 may be switched on to provide live video feeds from other areas in the facility. All of these control means allow for the maximum amount of information to be transmitted to security and emergency personnel so that better and quicker decisions can be made in the event that an emergency situation arises in a facility.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A monitoring system for monitoring an alert indicative of an emergency situation comprising:
    at least one wireless transmitter transmitting a wireless signal indicating an emergency situation exists, said wireless signal further including information related to an individual to whom the wireless transmitter is assigned;
    a plurality of transceivers located throughout a facility including a first transceiver that receives the wireless signal and transmits an alert signal to a security alert station indicating the identity of the transceiver that received the wireless signal and identifying the individual to whom the wireless transceiver is assigned;
    wherein when said at least one wireless transmitter is moved away from the vicinity of said first transceiver and toward the vicinity of a second transceiver, the second transceiver transmits an alert signal to the security alert station indicating the identity of the second transceiver and identifying the individual to whom the wireless transmitter is assigned; and
    wherein when both the first and second transceivers transmit alert signals, the system performs a signal strength comparison to determine which transceiver received a stronger wireless signal such that the monitoring system tracks the movement of the at least one wireless transmitter as it moves throughout the facility.

2. The monitoring system of claim 1 wherein each of said plurality of transceivers has a threshold signal level that must be reached prior to transmission of the alert signal.

3. The monitoring system of claim 1 wherein said at least one wireless transmitter comprises a keyfob.

4. The monitoring system of claim 1 wherein said wireless signal is an RF signal.

5. The monitoring system of claim 1 wherein when more than two transceivers receive a wireless signal that exceeds a threshold level of the respective transceivers, signal triangulation is used by the system to identify the location of said at least one wireless transmitter.

6. The monitoring system of claim 1 wherein the security alert station is located at the facility.

7. The monitoring system of claim 6 further comprising a visual display coupled to the monitoring system, said visual display presenting the layout of the facility and identifying the location of the transceiver in alert.

8. The monitoring system of claim 7 wherein said security alert station is coupled to a remote central monitoring station via a network connection.

9. The monitoring system of claim 1 further comprising an alert system to notify the facility of an alert status.

10. The monitoring system of claim 9 wherein said alert system provides for an automatic wireless alert to be sent to select personnel on site at the facility.

11. The monitoring system of claim 1 wherein said monitoring system allows a user to lock down the facility.

12. The monitoring system of claim 1 wherein said plurality of transceivers comprise wall-mounted transceivers.

13. The monitoring system of claim 12 wherein said wall-mounted transceivers provide two-way audio communication when activated.

14. The monitoring system of claim 1 further comprising a plurality of cameras positioned throughout the facility such that upon activation of one of said plurality of transceivers, one of said cameras will provide a video feed of the area adjacent to the activated transceiver.

15. The monitoring system of claim 14 wherein any of said plurality of cameras may be turned on from a remote location to provide a video feed of various parts of the facility.

16. The monitoring system of claim 1 wherein said wireless transmitter comprises a wireless transceiver.

17. The monitoring system of claim 16 wherein said wireless transceiver receives information related to the emergency situation.

18. The monitoring system of claim 1 wherein said plurality of transceivers are coupled to an AC power line and the alert signal is transmitted to the to the security alert station at least in part, via the AC power line.

19. A method of monitoring an alert indicative of an emergency situation comprising the steps of:
  positioning a plurality of transceivers throughout a facility;
  coupling the plurality of transceivers to a security alert station;
  providing at least one wireless transmitter;
  storing information related to an individual on the at least one wireless transmitter;
  transmitting a wireless signal from the at least one wireless transmitter to at least one of the plurality of transceivers indicating an emergency situation exists, the wireless signal including information related to the individual to whom the wireless transmitter is assigned;
  receiving the wireless signal at a first transceiver;
  transmitting an alert signal from the first transceiver to a security alert station indicating the identity of the first transceiver and identifying the individual to whom the wireless transmitter is assigned;
  moving the wireless transmitter away from the vicinity of the first transceiver and toward the vicinity of a second transceiver;
  receiving the wireless signal at the second transceiver;
  transmitting an alert signal from the second transceiver to the security alert station indicating the identity of the second transceiver and identifying the individual to whom the wireless transmitter is assigned;
  performing a signal strength comparison of the wireless signals received at the first and second transceivers;
  determining a location of the wireless transmitter based at least in part on the signal strength comparison such that the movement of the at least one wireless transmitter is tracked as it is moved throughout the facility.

20. The method of monitoring an alert of claim 19 wherein each of the plurality of transceivers has a threshold signal level that must be reached prior to transmission of the alert signal.

21. The method of monitoring an alert of claim 19 wherein the at least one wireless transmitter comprises a keyfob.

22. The method of monitoring an alert of claim 19 wherein the wireless signal is an RF signal.

23. The method of monitoring an alert of claim 19 wherein when more than two transceivers receive a wireless signal that exceeds a threshold level of the respective transceivers, signal triangulation is used to identify the location of the at least one wireless transmitter.

24. The method of monitoring an alert of claim 19 wherein the security alert station is located at the facility.

25. The method of monitoring an alert of claim 24 further comprising the step of displaying a visual representation of the facility layout and identifying the location of the transceiver in alert.

26. The method of monitoring an alert of claim 25 further comprising the step of coupling the security alert station to a remote central monitoring station via a network connection.

27. The method of monitoring an alert of claim 19 further comprising the step of notifying the facility of an alert status.

28. The method of monitoring an alert of claim 27 further comprising the step of sending an automatic wireless alert to select personnel on site at the facility.

29. The method of monitoring an alert of claim 19 further comprising the step of locking down the facility.

30. The method of monitoring an alert of claim 19 further comprising the step of mounting the plurality of transceivers to various walls in the facility.

31. The method of monitoring an alert of claim 30 further comprising the step of providing two-way audio communication between the wall-mounted transceiver and a central location.

32. The method of monitoring an alert of claim 19 further comprising the steps of:
  positioning a plurality of cameras throughout the facility;
  activating at least one of the plurality of cameras in a vicinity of an activated transceiver; and
  transmitting a video feed of an area in the vicinity to the activated transceiver.

33. The method of monitoring an alert of claim 19 wherein the wireless transmitter comprises a wireless transceiver.

34. The method of monitoring an alert of claim 33 wherein the wireless transceiver receives information related to the emergency situation.

35. The method of monitoring an alert of claim 19 wherein the plurality of transceivers are coupled to an AC power line and the alert signal is transmitted to the to the security alert station at least in part, via the AC power line.

* * * * *

UNITED STATES PATENT AND TRADEMARK OFFICE
CERTIFICATE OF CORRECTION

| | | |
|---|---|---|
| PATENT NO. | : 7,821,389 B2 | |
| APPLICATION NO. | : 12/055703 | |
| DATED | : October 26, 2010 | |
| INVENTOR(S) | : William E. Houde, Jr. et al. | |

It is certified that error appears in the above-identified patent and that said Letters Patent is hereby corrected as shown below:

On the title page item (76), "Nichols C. Everett" should read:

-- Everett C. Nichols --

Signed and Sealed this
Twenty-sixth Day of April, 2011

David J. Kappos
*Director of the United States Patent and Trademark Office*